No. 795,636. PATENTED JULY 25, 1905.
H. MIKOREY.
MILK CAN.
APPLICATION FILED APR. 14, 1905.
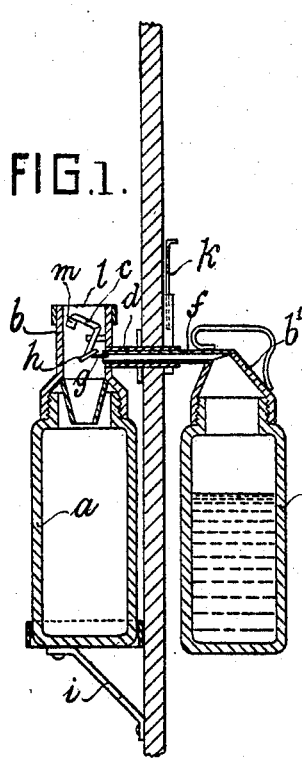
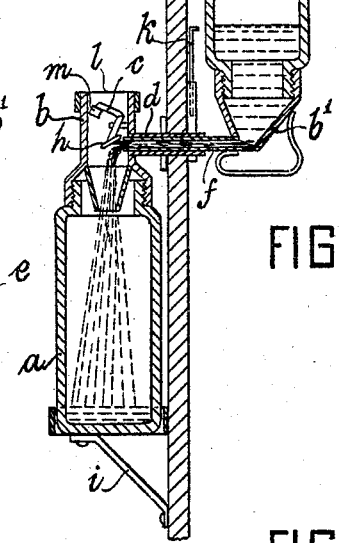
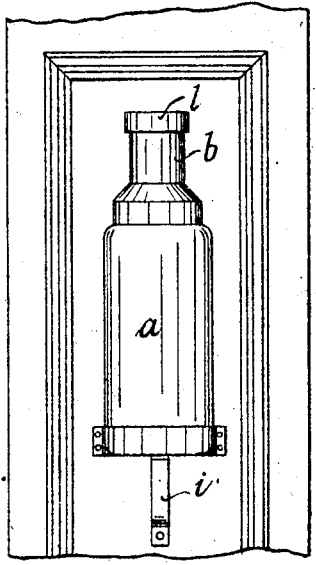
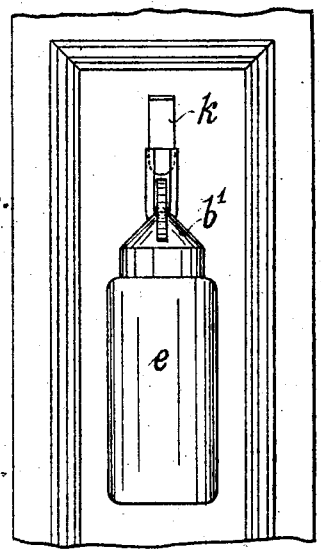
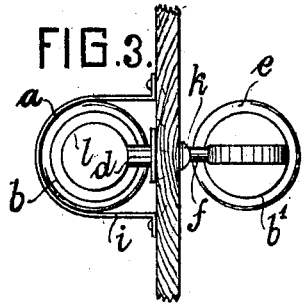
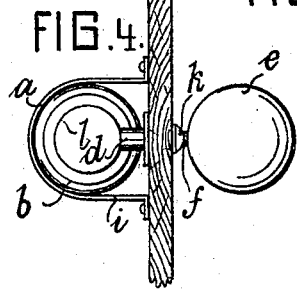
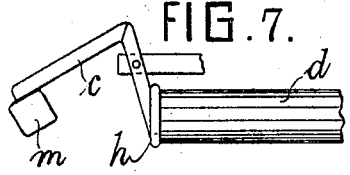
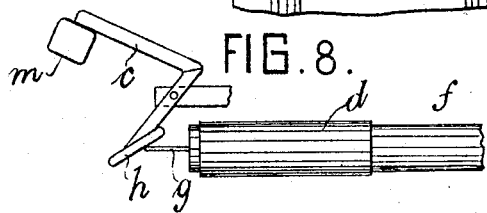
Witnesses
Inventor
Hans Mikorey

UNITED STATES PATENT OFFICE.

HANS MIKOREY, OF SCHÖNEBERG, NEAR BERLIN, GERMANY, ASSIGNOR TO THE FIRM OF W. GRAAFF & COMPANY, GESELLSCHAFT MIT BESCHRÄNKTER HAFTUNG, OF BERLIN, GERMANY.

MILK-CAN.

No. 795,636.      Specification of Letters Patent.      Patented July 25, 1905.

Application filed April 14, 1905. Serial No. 255,672.

*To all whom it may concern:*

Be it known that I, HANS MIKOREY, a subject of the German Emperor, residing at No. 13 Wartburgstrasse, Schöneberg, near Berlin, Germany, have invented new and useful Improvements in Milk-Cans, of which the following is a specification.

This invention has for its object to obviate the inconveniences in supplying milk to the household which consist in the fact that sometimes nobody is at home to receive the milk when delivered or that the vessels filled with milk can be easily misappropriated when accessible to unauthorized persons. These drawbacks are obviated by furnishing the milkman with a can which enables a vessel in the house of the customer to be filled with milk.

Referring to the accompanying drawings, Figure 1 is a longitudinal section through a door and the two vessels connected to each other. Fig. 2 is a like view showing the milkman's vessel turned upside down, so as to discharge the milk into the house vessel. Fig. 3 is a plan of Fig. 1. Fig. 4 is a plan of Fig. 2. Fig. 5 is an elevation of the house vessel. Fig. 6 is a like view of the milkman's vessel. Figs. 7 and 8 are enlarged views showing the closing device in different positions.

A vessel $a$ is arranged on the inside of the house-door on a bracket $i$, and a small tube $d$, closable by a flap-valve $e$, is provided on the removable upper part $b$ of the vessel, said tube being visible on the outside of the door. A second vessel $e$, with removable upper part $b'$, is also provided with a small tube $f$, which fits into the tube $d$.

The vessel $a$ is filled in the following manner: The milkman inserts the tube $f$ of his can $e$ into the tube $d$. A pin $g$ on the tube $f$ presses the flap $h$ away from the opening of the tube $d$.

In order that the milk may flow out of the vessel $e$ into the vessel $a$, it is necessary to reverse the former, as shown in Fig. 2. After use the flap $h$ returns to its closed position, Fig. 7, by the weight of the part $m$.

The hole in the door is closed by a slide $k$ when the can is removed.

Having now particularly described and ascertained the nature of my said invention and in what manner the same is to be performed, I declare that what I claim, and wish to secure by Letters Patent, is—

A device for receiving milk comprising a vessel $a$ adapted to be placed inside the door of the house and provided on its upper part with a small tube $d$ adapted to be closed in the interior of the vessel by a gravity-valve $c$, a second vessel $e$ adapted to be placed outside the door and being closed at its upper part, a tube $f$ connected to said vessel $e$ and being adapted to extend from the outside of the door through a hole in the latter into the tube $d$, said tube $f$ carrying a pin $g$ which opens the valve $c$, while the vessel $e$ for the purpose of being emptied is adapted to be turned on the longitudinal axis of the tubes uniting the vessels, substantially as described and shown in the drawings.

In testimony whereof I have signed my name to this specification in the presence of two subscribing witnesses.

HANS MIKOREY.

Witnesses:
    E. A. ANDERSON,
    J. L. STEPHENS.